(12) United States Patent
Yamada et al.

(10) Patent No.: US 8,126,618 B2
(45) Date of Patent: Feb. 28, 2012

(54) TRAVEL CONTROL APPARATUS FOR INDUSTRIAL VEHICLE

(75) Inventors: Tadashi Yamada, Kariya (JP); Hidenori Oka, Kariya (JP); Toshikazu Kamiya, Kariya (JP); Toshinari Fukatsu, Kariya (JP); Yoshiharu Ito, Kariya (JP)

(73) Assignee: Kabushiki Kaisha Toyota Jidoshokki, Aichi-ken (JP)

( * ) Notice: Subject to any disclaimer, the term of this patent is extended or adjusted under 35 U.S.C. 154(b) by 924 days.

(21) Appl. No.: 12/011,300

(22) Filed: Jan. 25, 2008

(65) Prior Publication Data
US 2008/0201044 A1    Aug. 21, 2008

(30) Foreign Application Priority Data
Jan. 26, 2007 (JP) ................................ 2007-015870

(51) Int. Cl.
  *B60K 28/00*   (2006.01)
  *G06F 7/70*    (2006.01)
  *G06F 19/00*   (2006.01)
  *G06G 7/00*    (2006.01)
  *G06G 7/76*    (2006.01)
(52) U.S. Cl. ........................................ 701/50; 180/273
(58) Field of Classification Search ................ 701/50; 180/272, 273; 414/674
See application file for complete search history.

(56) References Cited

U.S. PATENT DOCUMENTS 5,109,945 A    5/1992    Koga ............................ 180/273

FOREIGN PATENT DOCUMENTS

GB    2 293 364 A    3/1996

(Continued)

OTHER PUBLICATIONS

European Search Report for Application No. EP 08 15 0618, dated Jul. 7, 2009.

(Continued)

*Primary Examiner* — Christopher J. Novosad
(74) *Attorney, Agent, or Firm* — Locke Lord LLP

(57) ABSTRACT

A travel control apparatus for a forklift is disclosed. The forklift is provided with a loading device that performs load handling operations by raising and lowering a load, and a drive motor which generates a drive force for travel and is capable of generating a braking force. The apparatus is provided with a sensor for detecting the speed of the motor, a seat switch, a height switch, a load sensor, and a control section. The control section causes the drive motor to generate a braking force when the seat switch detects that the driver has left the seat in the case where the motor speed sensor detects a traveling state, and also changes the strength of the braking in accordance with the height of the loading device and the weight of the load.

9 Claims, 4 Drawing Sheets

FOREIGN PATENT DOCUMENTS

| | | |
|---|---|---|
| JP | 2-51934 | 4/1990 |
| JP | 02-139477 U | 11/1990 |
| JP | 05-076102 A | 3/1993 |
| JP | 07-35222 U | 6/1995 |
| JP | 2001-199698 A | 7/2001 |
| JP | 2002-096999 A | 4/2002 |
| JP | 2003-235114 | 8/2003 |
| WO | 99/16636 A1 | 4/1999 |

OTHER PUBLICATIONS

English translation of Japanese Office Action for Application No. 2007-015870, dated Aug. 24, 2011.

TRAVEL CONTROL APPARATUS FOR INDUSTRIAL VEHICLE

BACKGROUND OF THE INVENTION

The present invention relates to a travel control apparatus for controlling travel of industrial vehicles, such as a forklift.

Forklifts are widely used as a conventional industrial vehicle for load handling operations (load lifting operations and load placing operations) within premises of a factory. It is necessary for a driver to carry out load handling operations in addition to driving the vehicle of this type of forklift, and therefore, the driver sometimes leaves the vehicle in an idling state. Thus, forklifts have recently been put into practical use to which a function has been installed that prevents them from being driven without a driver by detecting that the driver has left the seat and making sure that the forklift is in the neutral state (the state where no drive force is transmitted to the driving wheels even when the accelerator pedal is pressed down) when there is no driver. In the forklift in Japanese Laid-Open Utility Model Publication No. 2-51934, for example, a seat switch for detecting whether a driver is sitting in the driver's seat is provided, and in the case where the seat switch detects that the driver has left the seat, electricity is cut off from the solenoid valve for switching the flow of hydraulic oil to the transmission (clutch mechanism) connected to the engine.

Though Japanese Laid-Open Utility Model Publication No. 2-51934 discloses a forklift having an engine, it is also possible for a battery-driven vehicle, which has a battery and travels by means of the power of the drive motor, to have the same function as that in the above described publication through motor control. As described in Japanese Laid-Open Patent Publication No. 2003-235114, for example, the above described control may include regenerative braking depending on the situation.

Incidentally, the idea of the above described function which is installed in the forklift in Japanese Laid-Open Utility Model Publication No. 2-51934 and prevents it from being driven without a driver was thought of under the premise that the vehicle is in a stopped state. Therefore, in the case where the driver leaves the seat when the forklift is in a stopped state, the forklift can be prevented from moving because the forklift remains in the neutral state even when the direction lever (for making the vehicle travel forward or backward at the driver's will) is mistakenly operated in the state where the driver has left the seat. In the case where the driver leaves the seat when the forklift is in a traveling state, however, the forklift travels in the neutral state. The vehicle in this state naturally reduces speed, and therefore, the stopping distance becomes long. Thus, in the case of a battery-driven vehicle, it is possible to use the regenerative brakes disclosed in Japanese Laid-Open Patent Publication No. 2003-235114 so that the regenerative brakes make the stopping distance short even in the case where the driver leaves the seat when the forklift is in a traveling state.

Forklifts, however, have a great difference in the stability of the vehicle when traveling depending on the loading state, as can be seen from its characteristics in terms of the application. For example, the location of the center of gravity of the vehicle changes between the state of carrying a load and the state of carrying no load, and therefore, there is a difference in the stability of the vehicle when traveling. In the state of carrying a load, there is also a difference in the stability of the vehicle when traveling depending on the weight of the load (load weight), the height of the fork, the tilt angle of the fork and the like. Therefore, in the case where the driver leaves the seat of a forklift having regenerative brakes when a load is placed on the fork, for example, in a state where the fork is raised high, the regenerative brakes are applied as the driver leaves, and thus, there is a risk that the stability of the vehicle when traveling may be reduced.

SUMMARY OF THE INVENTION

An objective of the present invention is to provide a travel control apparatus for an industrial vehicle, which apparatus reduces the stopping distance through braking while preventing the stability of the vehicle when traveling from being reduced even in the case where the driver leaves the seat in a traveling state.

To achieve the foregoing objective and in accordance with one aspect of the present invention, a travel control apparatus for an industrial vehicle is provided. The vehicle is provided with a loading device that performs load handling operations by raising and lowering a load, and a drive device which generates a drive force for travel and is capable of generating a braking force. The apparatus includes a traveling state detector for detecting whether the vehicle is in a traveling state, an unseated state detector for detecting whether a driver has left the vehicle's driver's seat, a height detector for detecting the height of the loading device, a load weight detector for detecting the weight of a load placed on the loading device, and a control section for controlling the vehicle when traveling. When the unseated state detector detects that a driver has left the driver's seat in the case where the traveling state detector detects a traveling state, the control section causes the drive device to generate the braking force and changes the braking strength in accordance with the height and the weight of the load.

In accordance with another aspect of the present invention, a method for controlling the travel of an industrial vehicle is provided. The vehicle is provided with a loading device that performs load handling operations by raising and lowering a load, and a drive device which generates a drive force for travel and is capable of generating a braking force. The method includes: detecting whether the vehicle is in a traveling state; detecting whether a driver has left a vehicle's driver's seat; detecting the height of the loading device; detecting the weight of the load placed on the loading device; and making the drive device generate a braking force when it is detected that a driver has left the seat in the case where it is detected that the vehicle is in a traveling state, and changing the strength of the braking in accordance with the height and the weight of the load.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

One embodiment of the present invention will now be described with reference to FIGS. 1 to 5B. In the following, the direction in which a driver of a forklift 10 faces in the forward direction of the forklift 10 (advancing direction) is defined as a forward direction. The backward, leftward, rightward, upward, and downward directions are defined with reference to the forward direction.

Figure 1:
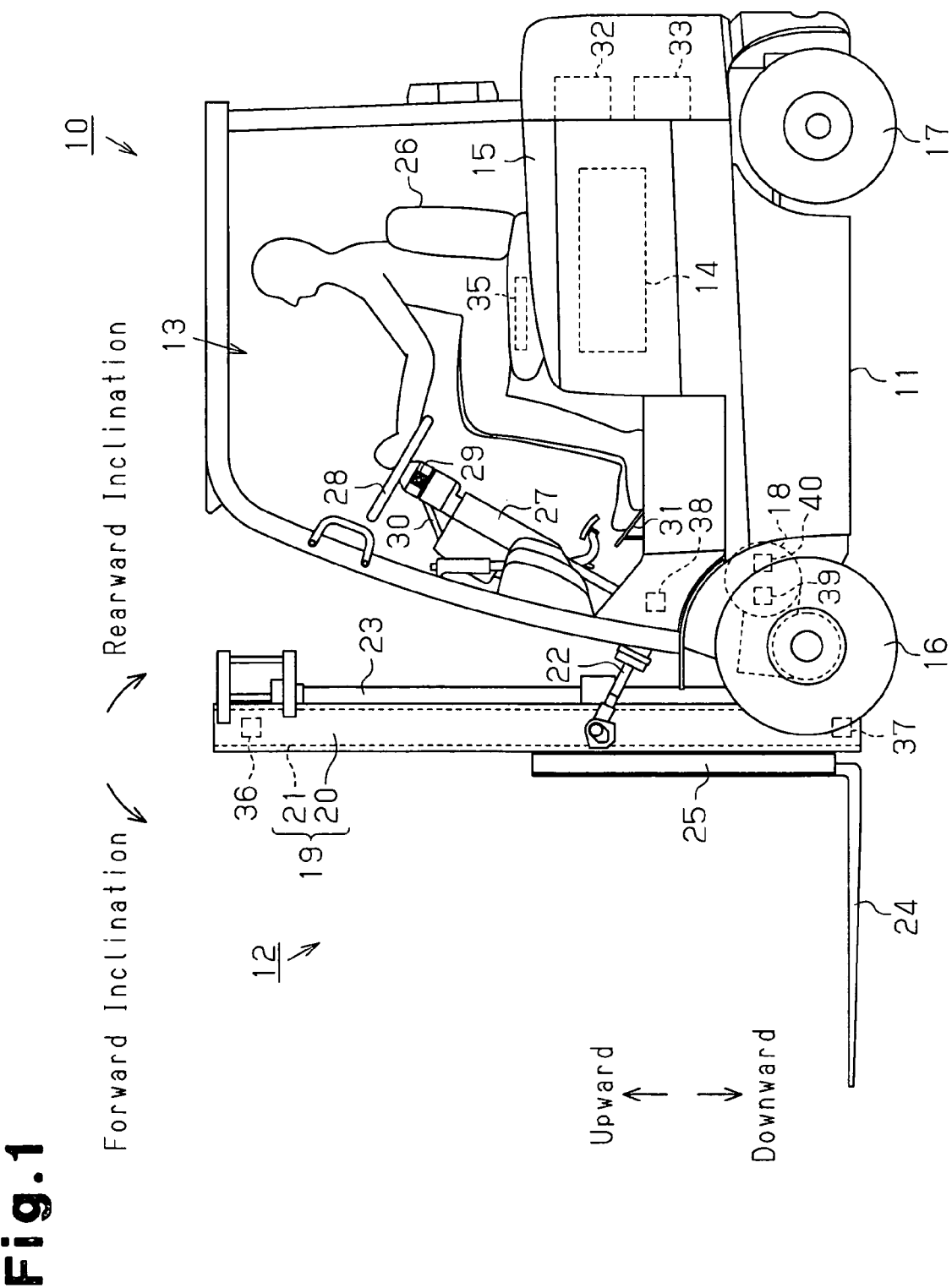
FIG. 1 is a side view showing the forklift according to one embodiment of the present invention.

As shown in FIG. 1, the forklift 10, which is an industrial vehicle, includes a vehicle body 11 and a loading device 12 provided in the front portion of the vehicle body 11. A cabin 13 is provided at the center of the vehicle body 11. A battery 14 and a battery hood 15 for containing the battery 14 are provided in the rear of the vehicle body 11. Drive wheels (front wheels) 16 are provided in the lower front portion of the vehicle body 11, and steerable wheels (rear wheels) 17 are provided in the lower rear portion of the vehicle body 11. A drive motor 18, which is a drive device contained in the vehicle body 11, is connected to the drive wheels 16. The forklift 10 according to the present embodiment is of a battery-driven type which travels when the drive force of the drive motor 18, which is powered by a battery 14 mounted in the vehicle body 11, rotates the drive wheels 16. The drive motor 18 also functions as a power generator, and when it functions as a power generator, the force of regenerative braking is generated so that the brakes can be applied to the forklift 10.

The loading device 12 is described below. A mast 19 is provided so as to stand in the front portion of the vehicle body 11, and this mast 19 is of a multiple stage type (two stage type in the present embodiment) made up of a pair of outer masts 20 on the left and right and a pair of inner masts 21 on the left and right. A hydraulic tilt cylinder 22 is connected to each outer mast 20 so that the outer mast 20 can tilt forward and backward relative to the vehicle body 11 through the operation of the tilt cylinder 22. A hydraulic lift cylinder 23 is connected to each inner mast 21 so that the inner mast 21 can slide upward and downward inside the corresponding outer mast 20 through the operation of the lift cylinder 23. In addition, a fork (loading attachment) 24 is provided to the mast 19 with a lift bracket 25. The lift bracket 25 is provided to the pair of inner masts 21 so that it can move upward and downward. Load handling operations (load lifting operations and load placing operations) are carried out when the fork 24 scoops up a pallet (not shown) on which a load is placed. Thus, the fork 24 is raised and lowered together with the lift bracket 25 when the inner masts 21 move upward and downward along the outer masts 20 through the driving of the lift cylinders 23. In addition, the fork 24 tilts (forward and backward) together with the mast 19 through the driving of the tilt cylinders 22.

The cabin 13 is provided with a driver's seat 26 on which a driver can sit. The driver's seat 26 is placed above the battery hood 15. When the driver sits in the driver's seat 26, the driver is in a driving position and present in the cabin 13. The state where a driver sits in the driver's seat 26 is a seated state, and the state where no driver sits in the driver's seat 26 is an unseated state (state where the driver has left the seat). In addition, a steering column 27 is provided in front of the driver's seat 26 in the cabin 13. A steering wheel 28 for changing the steering angle of the steerable wheels 17 is provided at the upper end of the steering column 27.

A forward and backward lever (direction lever) 29, with which the direction in which the vehicle travels (the direction in which the vehicle moves) is determined, is provided to the left of the steering column 27. In the present embodiment, "forward" and "backward" can be selected and determined as the direction in which the vehicle travels by means of the forward and backward lever 29. The forward and backward lever 29 can be inclined forward from the neutral position through operation so that "forward" is selected and determined, and the forward and backward lever 29 can be inclined backward from the neutral position through operation so that "backward" is selected and determined. The position of the forward and backward lever 29 where "forward" is selected and determined is the forward position, and the position where "backward" is selected and determined is the backward position.

In addition, various types of operation levers 30, such as a lift lever for raising and lowering the fork 24 through operation and a tilt lever for tilting the mast 19 through operation, are provided to the right of the steering column 27. The lift cylinders 23 operate as a result of hydraulic oil being supplied via a hydraulic circuit (not shown) through the operation of an operation lever (lift lever) 30 for directing the lifting operation, and therefore, the fork 24 raises or lowers. In addition, the tilt cylinders 22 operate as a result of hydraulic oil being supplied via a hydraulic circuit (not shown) through the operation of an operation lever (tilt lever) 30 for directing the tilting operation, and therefore, the mast 19 tilts.

In addition, an accelerator pedal 31 is provided at the bottom (on the floor) of the cabin 13. The acceleration (travel) of the forklift 10 is directed by means of the accelerator pedal 31 in order to adjust the speed of the vehicle. The drive motor 18 generates output torque in accordance with the degree to which the accelerator pedal 31 is pressed down by the driver, and this drive force is transmitted to the drive wheels 16, and thus, the forklift 10 travels. In addition, in the case where the forward and backward lever 29 is in the "forward position" through operation, the drive motor 18 is controlled so that the vehicle travels forward, while in the case where the forward and backward lever 29 is in the "backward position" through operation, the drive motor 18 is controlled so that the vehicle travels backward. In the case where the forward and backward lever 29 is in the "neutral position" through operation, the drive force is not transmitted to the drive wheels 16 from the drive motor 18 even when the accelerator pedal 31 is pressed down through operation.

In addition, the vehicle body 11 is provided with a vehicle control device 32 for various types of control, including travel control of the forklift 10, and a motor controller 33 for controlling the drive motor 18. The vehicle control device 32 and the motor controller 33 are electrically connected so that signals can be transmitted and received in both directions.

The vehicle control device 32 and the motor controller 33 may be connected in any manner, wired connection or wireless connection. In the present embodiment, the vehicle control device 32 and the motor controller 33 form the control section.

Figure 2:
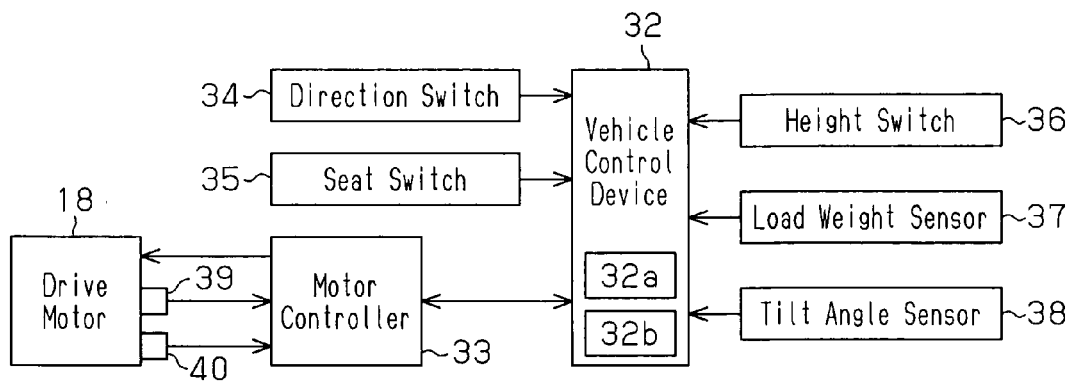
FIG. 2 is a block diagram showing the electric configuration of the forklift in FIG. 1.

Next, the electric configuration of the forklift 10 of the present embodiment is described in reference to FIG. 2.

A vehicle control device 32 is provided with a CPU (central processing unit) 32a which can carry out a control operation in a predetermined procedure and a memory 32b. Necessary data can be read out from and rewritten to the memory 32b. A control program for controlling travel, load handling of the forklift 10, as well as map data used for this control, are stored in the memory 32b. The forklift 10 of the present embodiment is formed in such a manner that regenerative brakes are applied so that traveling is stopped when it is detected that the driver has left the seat in a traveling state. Therefore, map data used for controlling the regenerative brakes is stored in the memory 32b. In addition, a direction switch 34, a seat switch (unseated state detector) 35, a fork height switch (height detector) 36, a load weight sensor (load weight detector) 37 and a fork tilt angle sensor (tilt angle detector) 38 are electrically connected to the vehicle control device 32.

The direction switch 34 is provided in the steering column (see FIG. 1), and detects the operational position of the forward and backward lever 29 (forward position or backward position). The direction switch 34 outputs a detection signal in accordance with the operational position of the forward and backward lever 29 to the vehicle control device 32. The direction switch 34 outputs a forward position detecting signal in the case where the forward and backward lever 29 is in the forward position, outputs a backward position detecting signal in the case where the forward and backward lever 29 is in the backward position, and does not output any detection signal in the case where the forward and backward lever 29 is in the neutral position. Accordingly, the CPU 32a of the vehicle control device 32 recognizes that the operational position of the forward and backward lever 29 is in the forward position or the backward position on the basis of the input of the detection signal from the direction switch 34, and recognizes that the operational position of the forward and backward lever 29 is in the neutral position when no detection signal is inputted.

The seat switch 35 is provided in the driver's seat 26 (see FIG. 1). The seat switch 35 detects whether the driver is in a driving position and present in the cabin 13 (whether the driver is sitting in the driver's seat 26), and outputs the detection signal indicating the results of this detection to the vehicle control device 32. The CPU 32a of the vehicle control device 32 recognizes that the driver is present in the cabin 13 when a detection signal is inputted from the seat switch 35, and recognizes that the driver is not present in the cabin 13 when no detection signal is inputted.

The fork height switch 36 is provided in the mast 19 (see FIG. 1). The fork height switch 36 detects the height of the fork 24 (position in terms of height) and outputs a detection signal when the fork 24 reaches a preset height (for example 2200 mm). The fork height switch 36 is made up of, for example, a limit switch. In the present embodiment, one fork height switch 36 is provided in the mast 19, and the region at the fork height detected by the fork height switch 36 and higher (for example 2200 mm and higher) is referred to as high fork height region, while the region lower than the fork height detected by the fork height switch 36 (for example lower than 2200 mm) is referred to as low fork height region. That is to say, the fork height switch 36 in the present embodiment detects whether the height of the fork 24 is at the high fork height or the low fork height. The CPU 32a of the vehicle control device 32 recognizes that the height of the fork 24 is in the high fork height region when a detection signal is inputted from the fork height switch 36, and recognizes that the height of the fork 24 is in a low fork height region when no detection signal is inputted.

The load weight sensor 37 is provided within the hydraulic circuit in the vicinity of the lower portion of the lift cylinders 23 (see FIG. 1). The load weight sensor 37 detects the weight of the load placed on the fork 24 (load weight). The load weight sensor 37 detects the oil pressure inside the lift cylinders 23 and outputs a detection signal in accordance with the weight of the load placed on the fork 24. The load weight sensor 37 is made up of, for example, a pressure sensor. In addition, the CPU 32a of the vehicle control device 32 recognizes the weight of the load placed on the fork 24 when a detection signal is inputted from the load weight sensor 37.

The fork tilt angle sensor 38 is provided in the vicinity of the tilt cylinders 22 (see FIG. 1). The fork tilt angle sensor 38 detects the fork tilt angle. The fork tilt angle sensor 38 detects the tilt angle of the fork 24 in reference to the angle (horizontal angle) when the fork 24 is in a lateral position and outputs a detection signal in accordance with this fork tilt angle. The fork tilt angle sensor 38 is made up of, for example, a potentiometer. The CPU 32a of the vehicle control device 32 recognizes the tilt angle of the fork 24 when a detection signal is inputted from the fork tilt angle sensor 38.

A drive motor 18 and motor speed sensors (traveling state detector and moving direction detector) 39 and 40 are electrically connected to the motor controller 33. The motor controller 33 controls the drive motor 18 so that it rotates at a rotational speed in accordance with a control instruction outputted from the vehicle control device 32 when the control instruction is inputted. In addition, the motor controller 33 recognizes the rotational speed of the drive motor 18 and the direction in which the motor rotates when a detection signal is inputted from the motor speed sensors 39 and 40.

In the present embodiment, the vehicle control device 32 (CPU 32a, memory 32b), the seat switch 35 connected to the vehicle control device 32, the fork height switch 36, the load weight sensor 37, the fork tilt angle sensor 38 and the motor speed sensors 39 and 40 form a travel control apparatus for the forklift 10.

In the following, the map data for controlling the regenerative brakes, which is stored in the memory 32b of the vehicle control device 32, is described in detail in reference to FIGS. 3 and 4. In the forklift 10 of the present embodiment, different pieces of map data are used during forward traveling and backward traveling of the forklift 10 in order to control the regenerative brakes. Therefore, the memory 32b of the vehicle control device 32 stores map data used in the case where it is detected that the driver has left the seat during forward traveling of the forklift 10 and map data used in the case where it is detected that the driver has left the seat during backward traveling of the forklift 10. Here, "stopped state" of the forklift 10 in the present specification means a case where the vehicle speed is "approximately 0 (zero) km/h" (for example in the case where the speed is in a range from 0 km/h to 2 km/h), and the forklift 10 is in a "traveling state" in the case where the forklift 10 is not in the "stopped state."

Figure 3:
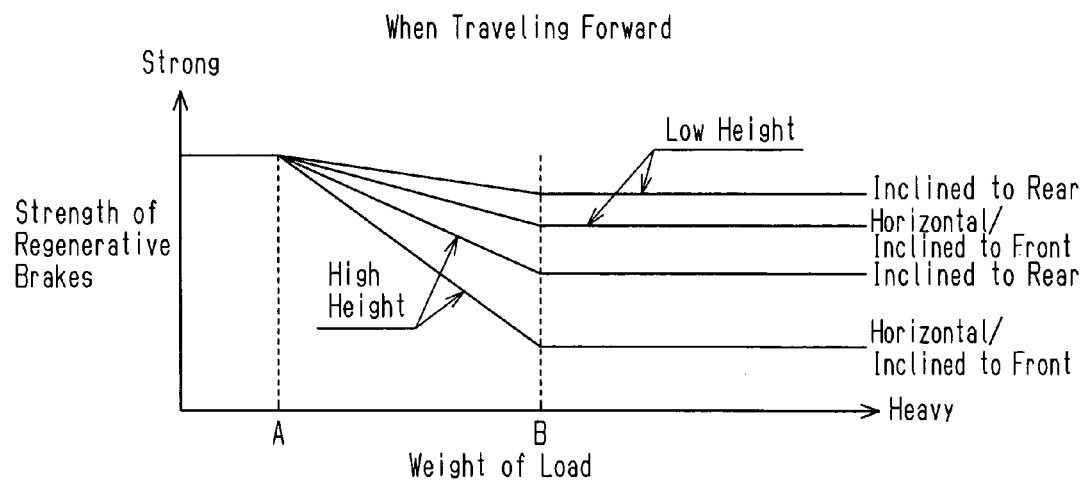
FIG. 3 is a graph illustrating the relationship of the load, the height of the fork and the tilt angle of the fork to the strength of the regenerative brakes when the forklift in FIG. 1 is traveling forward.

FIG. 3 is a graph showing the strength of the regenerative brakes during forward traveling of the forklift 10, and map data used for controlling the regenerative brakes during forward traveling of the forklift 10 is generated on the basis of the relationship shown in this graph. In addition, FIG. 4 is a graph showing the strength of the regenerative brakes during backward traveling of the forklift 10, and map data used for controlling the regenerative brakes during backward traveling of the forklift 10 is generated on the basis of the relationship shown in this graph. In these FIGS. 3 and 4, the vertical axis indicates the "strength of the regenerative brakes," that is to say, the degree of the braking force generated through regeneration, and the horizontal axis indicates the "weight of the load." In FIGS. 3 and 4, the strength of the regenerative brakes increases toward the upper side along the vertical axis, and the strength of the regenerative brakes decreases toward the lower side along the vertical axis. In addition, the load is the "load placed on" the fork 24 as detected by the load weight sensor 37, and the weight of the load becomes greater toward the right side along the horizontal axis and the weight of the load becomes smaller toward the left side along the horizontal axis.

In FIG. 3, the strength of the regenerative brakes during forward traveling of the forklift 10 is set on the basis of three parameters: the weight of the load, the fork height and the fork tilt angle. That is to say, in FIG. 3, the strength of the regenerative brakes corresponds to the conditions in terms of whether the height of the fork 24 is a low height or a high height, the conditions in terms of whether the fork tilt angle is inclined to the rear or horizontal/inclined to the front, and the conditions in terms of the weight of the load. Concretely, FIG. 3 shows data where the strength of the regenerative brakes corresponds to the conditions in terms of "low" for the fork height, "inclined to the rear" for the fork tilt angle and the weight of the load, and data where the strength of the regenerative brakes corresponds to the conditions in terms of "low" for the fork height, "horizontal/inclined to the front" for the fork tilt angle and the weight of the load. In addition, FIG. 3 shows data where the strength of the regenerative brakes corresponds to the conditions in terms of "high" for the fork height, "inclined to the rear" for the fork tilt angle and the weight of the load, and data where the strength of the regenerative brakes corresponds to the conditions in terms of "high" for the fork height, "horizontal/inclined to the front" for the fork tilt angle and the weight of the load.

As shown in FIG. 3, the strength of the regenerative brakes is set constant, irrespectively of the conditions in terms of the fork height and the fork tilt angle, in such a range that the load weight value A is not exceeded under the control of the regenerative brakes during forward traveling of the forklift 10. In addition, the strength of the regenerative brakes is set so as to continuously decrease as the weight of the load increases, in accordance with the conditions in terms of the fork height and the fork tilt angle, in a range from the load weight value A to the load weight value B (>load weight value A). Therefore, the strength of the regenerative brakes changes in accordance with the conditions in terms of the fork height and the fork tilt angle even for the same weight of the load in a range from the load weight value A to the load weight value B. In addition, the strength of the regenerative brakes at the time of the load weight value B is kept constant in such a range that the load weight value B is exceeded. Here, the strength of the regenerative brakes in such a range as to exceed the load weight value B is set so as to be weaker than the strength of the regenerative brakes in such a range as not to exceed the load weight value A and in a range from the load weight value A to the load weight value B.

In each relationship between the conditions and the strength of the regenerative brakes shown in FIG. 3, the strength of the regenerative brakes becomes weaker in the case where the height of the fork 24 is a high height than in the case of a low fork height, and the strength of the regenerative brakes becomes weaker in the case where the fork tilt angle is horizontal/inclined to the front than in the case when the fork 24 is inclined to the rear. Therefore, under the control of the regenerative brakes during forward traveling of the forklift 10, the strength of the regenerative brakes is strongest in the case of a low fork height and when the fork 24 is inclined to the rear for a load of the same weight, and the strength of the regenerative brakes becomes weaker in the order of the case of a low fork height and when horizontal/inclined to the front, the case of a high fork height and when the fork 24 is inclined to the rear, and the case of a high fork height and when horizontal/inclined to the front. In addition, the control of the regenerative brakes during forward traveling of the forklift 10 is carried out with consideration for the fact that the stability of the vehicle when traveling easily lowers when the regenerative brakes are applied in the case where the height of the fork 24 is a high fork height or in the case where the fork tilt angle is horizontal/inclined to the front in comparison with the case where the fork height is a low height or the fork tilt angle is inclined to the rear. Each relationship between the conditions and the strength of the regenerative brakes shown in FIG. 3 is determined from the results of simulation through which the strength of the regenerative brakes for stabilizing the vehicle when the regenerative brakes are applied during forward traveling of the forklift 10 is found. When the fork tilt angle is horizontal, an allowable error margin is included, and this allowable error margin is an inclination of approximately 1 degree to the front side or to the rear side. Accordingly, "horizontal" includes inclination in a range from a fork tilt angle of 1 degree to the front to a fork tilt angle of 1 degree to the rear. Therefore, the fork tilt angle to the front indicates a range exceeding the above described horizontal range up to the maximum inclined angle to the front, and the fork tilt angle to the rear indicates a range exceeding the above described horizontal range up to the maximum inclined angle to the rear.

Figure 4:
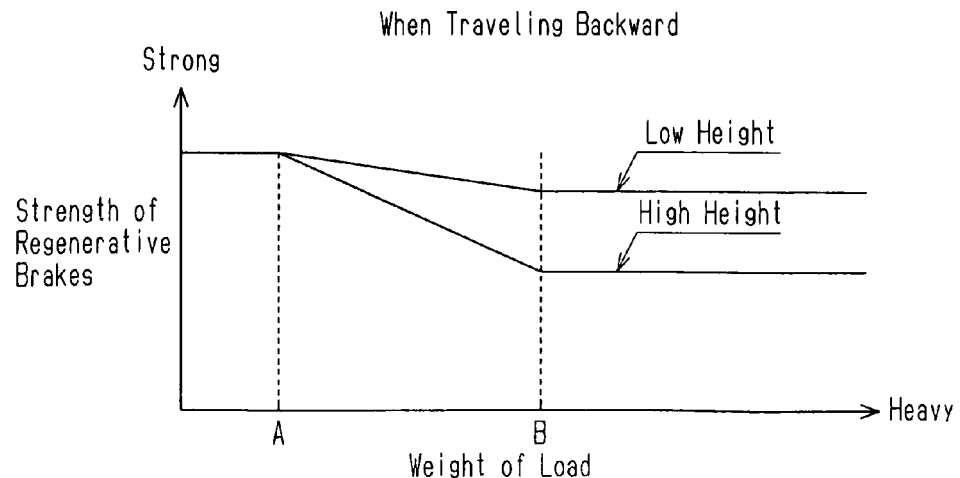
FIG. 4 is a graph illustrating the relationship of the load and the height of the fork to the strength of the regenerative brakes when the forklift in FIG. 1 is traveling backward.

In FIG. 4, the strength of the regenerative brakes during backward traveling of the forklift 10 is set on the basis of two parameters: the weight of the load and the fork height. In FIG. 4, the strength of the regenerative brakes corresponds to the conditions in terms of whether the fork height is a low fork height or a high fork height, and the conditions in terms of the weight of the load. Concretely, FIG. 4 shows data where the strength of the regenerative brakes corresponds to the conditions in terms of "low" for the fork height and the weight of the load, and data where the strength of the regenerative brakes corresponds to the conditions in terms of "high" for the fork height and the weight of the load.

In addition, under the control of the regenerative brakes during backward traveling of the forklift 10 in the present embodiment, as shown in FIG. 4, the strength of the regenerative brakes is set constant irrespectively of the conditions in terms of the fork height in such a range that the load weight value A is not exceeded. In addition, the strength of the regenerative brakes is set so as to continuously decrease as the weight of the load increases in accordance with the conditions in terms of the fork height in a range from the load weight value A to the load weight value B (>load weight value A). Therefore, the strength of the regenerative brakes changes in accordance with the conditions in terms of the fork height for a load of the same weight in a range from the load weight value A to the load weight value B. In addition, the strength of the regenerative brakes at the time of the load weight value B is kept constant in such a range that the load weight value B is exceeded. The strength of the regenerative brakes in such a range that the load weight value B is exceeded is set so as to be weaker than the strength of the regenerative brakes in such a range that the load weight value A is not exceeded and in a range from the load weight value A to the load weight value B.

In each relationship between the conditions and the strength of the regenerative brakes shown in FIG. 4, the strength of the regenerative brakes becomes weaker in the case where the fork height is a high fork height than in the case of a low fork height. Therefore, under the control of the regenerative brakes during backward traveling of the forklift 10, the strength of the regenerative brakes in the case of a low fork height becomes strong and the regenerative brakes in the case of a high fork height becomes weak for a load of the same weight. In addition, the control of the regenerative brakes during backward traveling of the forklift 10 is carried out with consideration for the fact that the stability of the vehicle when traveling easily lowers when the regenerative brakes are applied in the case where the fork height is a high fork height in comparison with a case where the fork height is a low fork height. Each relationship between the conditions and the strength of the regenerative brakes shown in FIG. 4 is determined from the results of simulation through which the strength of the regenerative brakes for stabilizing the vehicle when the regenerative brakes are applied during backward traveling of the forklift 10 is found.

Figure 5B:
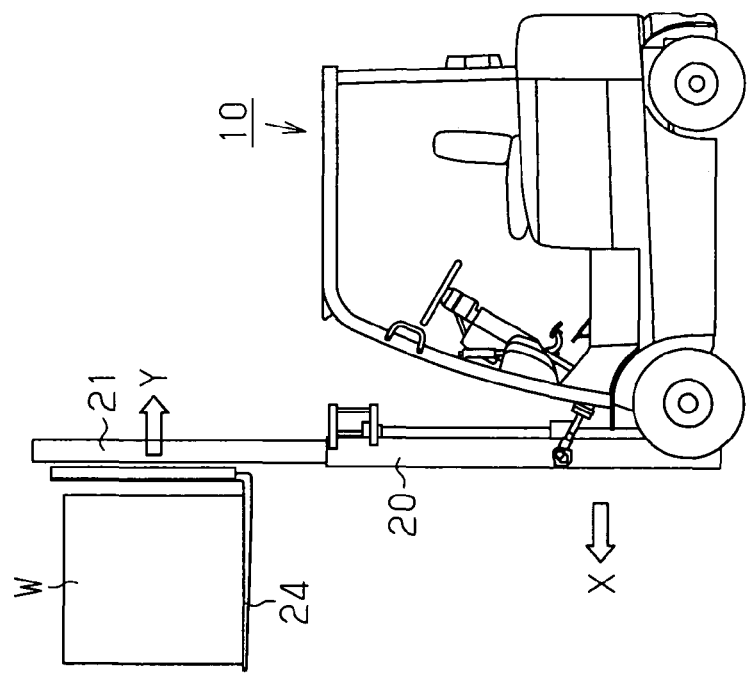
FIG. 5B is a diagram illustrating a state of the forklift in FIG. 1 in the case where braking is applied during backward traveling of the forklift.
Figure 5A:
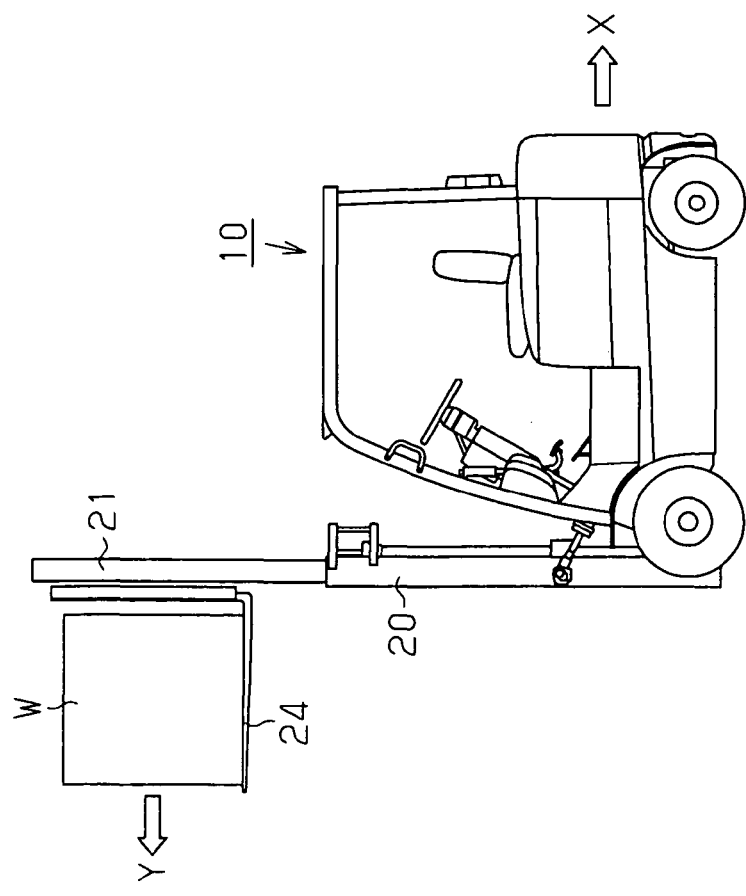
FIG. 5A is a diagram illustrating a state of the forklift in FIG. 1 in the case where braking is applied during forward traveling of the vehicle.

FIGS. 5A and 5B show the states of the vehicle (forklift 10) in the case where the brakes are applied during forward traveling and backward traveling of the forklift 10. In the case where the brakes are applied during forward traveling of the forklift 10, as shown in FIG. 5A, the force of the brakes works on the vehicle body in the direction of arrow X (direction toward rear of vehicle body) while the inertial force works on the load W in the direction of arrow Y (direction toward front of vehicle body). In this case, the force of the brakes working on the vehicle body and the inertial force working on the load W work on the vehicle in such a manner that the stability of the vehicle lowers. Therefore, the stability of the vehicle lowers even more easily during forward traveling of the forklift 10 in the case of a high fork height and in the case when the fork 24 is inclined to the front.

In contrast, as shown in FIG. 5B, in the case where the brakes are applied during backward traveling of the forklift 10, the braking force in the direction of arrow X (direction toward front of vehicle body) works on the vehicle body while the inertial force works on the load W in the direction of arrow Y (direction toward rear of vehicle body). In this case, the force of the brakes working on the vehicle body and the inertial force working on the load W are less likely to lower the stability of the vehicle than in the case where the brakes are applied during forward traveling of the forklift 10. Therefore, even in the case of a high fork height or in the case when the fork 24 is inclined to the front, the stability of the vehicle is unlikely to lower during backward traveling of the forklift 10, in comparison with during forward traveling of the forklift 10.

Taking these points into consideration, the control of the regenerative brakes during forward traveling of the forklift 10 in the present embodiment is executed based on a greater number of factors than in the control during backward traveling of the forklift 10, by adding the fork tilt angle to the conditions for calculating the strength of the regenerative brakes. Thus, under the control of the regenerative brakes during backward traveling of the forklift 10, the strength of the regenerative brakes is calculated from the conditions in terms of the weight of the load and the fork height, which greatly affect the stability of the vehicle when the regenerative brakes are applied.

In the following, the operation of the forklift 10 (contents of control of vehicle control device 32) in the resent embodiment will be described.

After the start of the forklift 10, the CPU 32a of the vehicle control device 32 recognizes whether the driver is seated in the driver's seat 26 from the detection signal of the seat switch 35. In addition, the CPU 32a recognizes the rotational speed of the drive motor 18 and the direction in which the motor rotates from the detection signal of the motor speed sensors 39 and 40 which is inputted via the motor controller 33. The CPU 32a recognizes whether the forklift 10 is in a traveling state or in a stopped state from this rotational speed and the direction in which the motor rotates, and also recognizes whether the vehicle is traveling forward or traveling backward in the case of a traveling state. In addition, the CPU 32a recognizes the operational position of the forward and backward lever 29, that is, whether the driver determines that the vehicle is to travel forward, backward or neither, from the detection signal of the direction switch 34.

In addition, when the accelerator pedal 31 is operated in a state where the driver is seated and determines that the vehicle is to travel either forward or backward through the operation of the forward and backward lever 29, the CPU 32a outputs a control instruction to the motor controller 33. This control instruction makes the motor controller 33 generate output torque in accordance with the degree of operation of the accelerator pedal 31 (degree to which the pedal is pressed down) in the drive motor 18. When a control instruction is inputted, the motor controller 33 controls the rotation of the drive motor 18 so that the forklift 10 travels at a vehicle speed in accordance with the inputted control instruction. As a result of this control, the forklift 10 travels at a vehicle speed in accordance with the degree to which the accelerator pedal 31 is pressed down in the direction determined by the driver through operation of the forward and backward lever 29 (direction of forward traveling or direction of backward traveling).

When it is determined that the driver has left the seat in a state in which the forklift 10 is traveling, the CPU 32a applies the regenerative brakes to the forklift 10. At this time, the CPU 32a applies the regenerative brakes with strength in accordance with the state of the vehicle when it is determined that the driver has left the seat (direction of traveling, weight of load, fork height, fork tilt angle). Concretely, the CPU 32a calculates the strength of the regenerative brakes in accordance with the map data shown in FIG. 3, on the basis of the weight of the load detected by the load weight sensor 37, the fork height detected by the fork height switch 36, and the fork tilt angle detected by the fork tilt angle sensor 38 in the case where it is determined that the driver has left the seat during forward traveling of the forklift 10. In addition, the CPU 32a outputs a control instruction for the drive motor 18 to the motor controller 33, so that the regenerative brakes are applied with the calculated strength.

Meanwhile, in the case where it is detected that the driver has left the seat during backward traveling of the forklift 10, the CPU 32a calculates the strength of the regenerative brakes in accordance with the map data shown in FIG. 4, on the basis of the weight of the load detected by the load weight sensor 37 and the fork height detected by the fork height switch 36. In addition, the CPU 32a outputs a control instruction for the drive motor 18 to the motor controller 33 so that the regenerative brakes are applied with the calculated strength.

As a result of this control, the regenerative brakes having strength in accordance with the state of the vehicle are applied to the forklift 10 in a traveling state. That is to say, in the case where the forklift 10 is traveling in such a state that the stability of the vehicle when traveling is unlikely to lower, the strength of the regenerative brakes applied to the forklift 10 is increased, while in the case where the forklift 10 is traveling in such a state that the stability of the vehicle when traveling is likely to lower, the strength of the regenerative brakes applied to the forklift 10 is decreased. Accordingly, in the forklift 10 of the present embodiment, in the case where the driver leaves the seat in a traveling state, the stopping distance can be shortened under the control of the regenerative brakes, and at the same time, the regenerative brakes prevent the stability of the vehicle when traveling from lowering.

In addition, in the case where it is determined that the driver has left the seat in a state where the forklift 10 has stopped traveling, the CPU 32a switches the forklift 10 to the neutral state. Therefore, even in the case where the forward and backward lever 29 is in an operational position, that is, the forward position or the backward position, as a result of operation, no output torque is generated by the drive motor 18, and the forklift 10 does not travel. The neutral state is canceled under such conditions that the driver sits in the driver's seat 26 and the forward and backward lever 29 is in the "forward position" or "backward position" after it is once in the "neutral position" through operation.

The present embodiment provides the following advantages.

(1) In the case where it is detected that the driver has left the seat during forward traveling of the forklift 10, the regenerative brakes are applied to the forklift 10 with strength corresponding to the conditions in terms of the weight of the load, the fork height and the fork tilt angle. Therefore, in the case where the regenerative brakes are applied during forward traveling of the forklift 10, the forklift 10 is stopped while preventing the stability of the forklift 10 when traveling from lowering. In addition, the stopping distance of the forklift 10 traveling forward is reduced by applying the regenerative brakes, in comparison with the case where the speed of the forklift 10 is naturally reduced.

(2) In the case where it is detected that the driver has left the seat during backward traveling of the forklift 10, the regenerative brakes are applied to the forklift 10 with strength corresponding to the conditions in terms of the weight of the load and the fork height. Therefore, in the case where the regenerative brakes are applied during backward traveling of the forklift 10, the forklift 10 is stopped while preventing the stability of the forklift 10 when traveling from lowering. In addition, the stopping distance of the forklift 10 traveling backward is reduced by applying the regenerative brakes, in comparison with the case where the speed of the forklift 10 is naturally reduced.

(3) The conditions which correspond to the strength of the regenerative brakes are different during forward traveling and backward traveling of the forklift 10. Therefore, control of the regenerative brakes can be achieved in accordance with the properties of the vehicle, in terms of the direction in which the forklift travels. In addition, the stability of the vehicle when traveling is less likely to lower during backward traveling of the forklift 10 than during forward traveling of the forklift 10, and therefore, the control of the regenerative brakes is simplified during backward traveling of the forklift 10. Thus, the load of the vehicle control device 32 is reduced.

(4) In addition, the map data used for the control of the regenerative brakes during forward traveling of the forklift 10 and the map data used for the control of the regenerative brakes during backward traveling of the forklift 10 are stored in the memory 32b of the vehicle control device 32, and these pieces of map data are used for the control of the regenerative brakes. Therefore, the load of the vehicle control device 32 is reduced.

(5) The map data is prepared in such a manner that the strength of the regenerative brakes is continuously changed in accordance with the weight of the load, and thus, the level of the strength of the regenerative brakes is changed following the weight of the load. As a result, sudden change is prevented in the strength of the regenerative brakes, even when the weight of the load changes due to vibration or the like in a traveling state.

(6) In the case where it is determined that the driver has left the seat in a stopped state, the forklift 10 is changed to the neutral state. Therefore, in the case where the driver has left the seat in a stopped state, the vehicle is prevented from moving without a driver.

(7) In addition, in the case where the forklift 10 is changed to the neutral state when the driver has left the driver's seat 26 in a stopped state, the conditions for canceling the neutral state include that the driver is seated and the forward and backward lever 29 is put in the forward position or the backward position through operation after the forward and backward lever 29 is once returned to the neutral position. Therefore, unless the driver intends to travel (puts the forward and backward lever 29 in the forward position or the backward position through operation), the neutral state is not canceled. Accordingly, the reliability when returning to a traveling state is increased in comparison with the case where the neutral state is canceled only as a result of detection by the switches, for example detection of the driver being seated by the seat switch 35 and detection of the neutral position by the direction switch 34.

It should be apparent to those skilled in the art that the present invention may be embodied in many other specific forms without departing from the spirit or scope of the invention. Particularly, it should be understood that the invention may be embodied in the following forms.

In the embodiment, the memory 32b of the vehicle control device 32 may store only the map data of FIG. 3 as map data relating to control of the regenerating brakes, and the strength of the regenerating brakes may be controlled in accordance with the map data. In this configuration, the CPU 32a of the vehicle control device 32 controls the strength of the regenerating brakes in accordance with the map data of FIG. 3 on the basis of the weight of the load, the fork height and the fork tilt angle, whichever the direction in which the vehicle is traveling is: forward or backward, in the case where it is determined that the driver has left the seat in a state where the forklift 10 is traveling.

In the embodiment, the memory 32b of the vehicle control device 32 may store only the map data of FIG. 4 as map data relating to control of the regenerating brakes, and the strength of the regenerating brakes may be controlled in accordance with the map data. In this configuration, the CPU 32a of the vehicle control device 32 controls the strength of the regenerating brakes in accordance with the map data of FIG. 4 on the basis of the weight of the load and the fork height, whichever the direction in which the vehicle is traveling is: forward or backward, in the case where it is determined that the driver has left the seat in a state where the forklift 10 is traveling.

Figure 6:
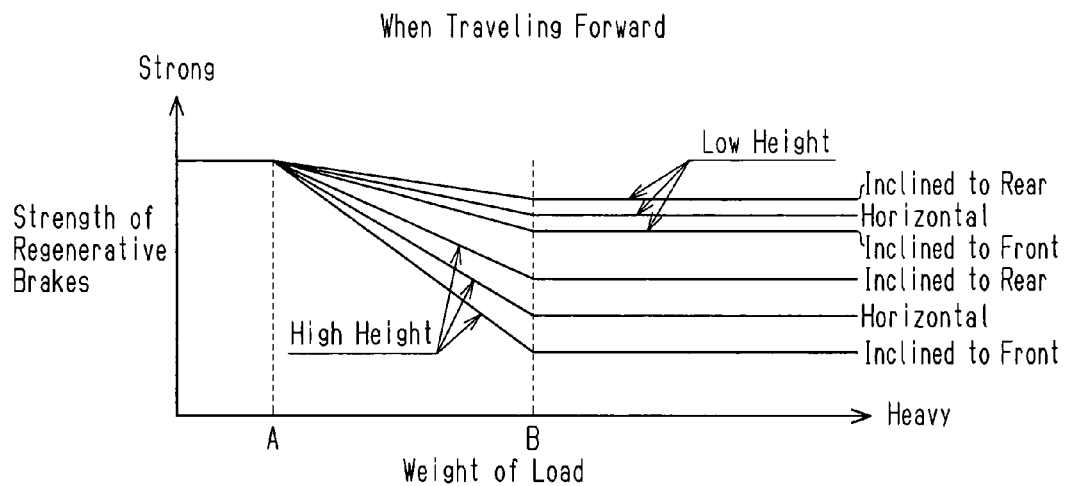
FIG. 6 is a graph illustrating the relationship of the load, the height of the fork and the tilt angle of the fork to the strength of the regenerative brakes according to another embodiment.

In the embodiment, as shown in FIG. 6, the control may be divided into smaller segments by associating the strength of the regenerative brakes to each of the case where the fork tilt angle is horizontal, the case when the fork 24 is inclined to the front, and the case when the fork 24 is inclined to the rear.

Figure 7:
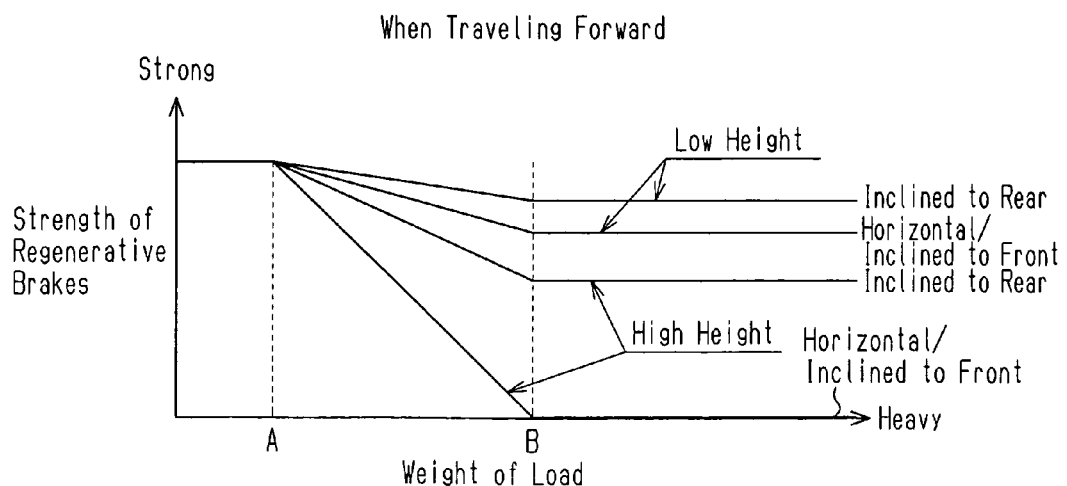
FIG. 7 is a graph illustrating the relationship of the load, the height of the fork and the tilt angle of the fork to the strength of the regenerative brakes according to still another embodiment.

In the embodiment, as shown in FIG. 7, the strength of the regenerative brakes in the case of a high fork height and in the case where the fork tilt angle is horizontal/inclined to the front may be "0 (zero)." In the case where the map data is prepared in this manner, the forklift 10 travels in the neutral state and stops as the speed is naturally reduced, when it is determined that the driver has left the seat when the fork height is a high fork height and the fork tilt angle is horizontal/inclined to the front.

In the embodiment, the strength of the regenerative brakes in a range from the load weight value A to the load weight value B shown in FIGS. 3 and 4 may be discretely reduced as the weight of the load increases. In this configuration, even when the load fluctuates due to vibration or the like caused in the forklift 10 when traveling, the level of the strength of the regenerative brakes is prevented from changing due to the fluctuation in the load. "Control for discretely reducing the strength" in the present embodiment refers to control in which the load weight value is divided into a number of ranges so that the strength of the regenerative brakes is kept constant even when the load weight value fluctuates within each range and the strength of the regenerative brakes is changed in the case where the division of the load weight value is switched. In contrast, "control for continuously reducing the strength" described in the first embodiment is control in which the strength of the regenerative brakes is changed in accordance with the change of the load weight value when it changes.

The invention according to the embodiment may be applied to an industrial vehicle in which a drive motor is mounted as the drive force when the vehicle travels. For example, the present invention may be applied to a forklift (hybrid forklift) in which an engine and a drive motor are mounted so that the two are used as the drive force when the vehicle travels. In addition, the present invention may also be applied to a forklift having a type of cabin in which the driver stands.

Though in the embodiment, the fork height is divided into two regions: the high fork height region and the low fork height region, the fork height may be divided into smaller regions, by adopting a configuration where the fork height is continuously detected using, for example, a reel sensor, and thus, the strength of the regenerative brakes may be controlled. The division of the fork height (high fork height region and low fork height region in the embodiment) is determined from the results of simulation of the stability of the vehicle when traveling. In addition, in the case of the embodiment, the fork height switch 36 is provided in a location which makes it possible to detect the division of the fork height.

As for division of the fork tilt angle in the embodiment, angles of rearward inclination and angles of forward inclination may be divided into a number of regions, and the strength of the regenerative brakes may be thus controlled.

Though the strength of the regenerative brakes is controlled in the embodiment, the strength of the brakes may be controlled by a braking apparatus. In the case where a hydraulic drum brake is adopted as a braking apparatus, the strength of the brakes is controlled by adjusting the liquid pressure value of the oil pressure. In this configuration, it becomes possible to apply the present invention to industrial vehicles (forklift 10) driven by, for example, an engine, in addition to industrial vehicles driven by a drive motor 18 as those in the embodiment.

Though the motor speed sensors 39 and 40 are used as moving direction detectors in the embodiment, the direction switch 34 may be used as a moving direction detector.

The present examples and embodiments are to be considered as illustrative and not restrictive and the invention is not to be limited to the details given herein, but may be modified within the scope and equivalence of the appended claims.

What is claimed is:

1. A travel control apparatus for an industrial vehicle, the vehicle being provided with a loading device that performs load handling operations by raising and lowering a load and tilting relative to a body of the vehicle, and a drive device which generates a drive force for travel and is capable of generating a braking force, the apparatus comprising:
   a traveling state detector for detecting whether the vehicle is in a traveling state;
   an unseated state detector for detecting whether a driver has left the vehicle's driver's seat;
   a height detector for detecting the height of the loading device;
   a load weight detector for detecting the weight of a load placed on the loading device;
   a tilt angle detector for detecting the tilt angle of the loading device; and
   a control section for controlling the vehicle when traveling,
   wherein, when the unseated state detector detects that a driver has left the driver's seat in the case where the traveling state detector detects a traveling state, the control section causes the drive device to generate the braking force and changes the braking strength in accordance with the height and the weight of the load,
   wherein, in the case where the detected tilt angle indicates that the loading device is horizontal, the control section weakens the braking strength in comparison with the case where the tilt angle indicates that the loading device is tilting backward, and
   wherein the control section shifts the vehicle to a neutral state in the case where the tilt angle indicates that the loading device is tilting forward.

2. The apparatus according to claim 1, wherein in the case where the height detected by the height detector is high, the control section weakens the braking strength in comparison with the case where the height is low.

3. The apparatus according to claim 1, wherein the heavier the weight of the load detected by the load weight detector is, the more the control section weakens the braking strength.

4. The apparatus according to claim 1, further comprising a moving direction detector for detecting the direction in which the vehicle moves,
   wherein the control section provides different control modes of the braking in accordance with the direction in which the vehicle moves.

5. The apparatus according to claim 4, wherein the loading device is formed so as to be able to tilt relative to a body of the vehicle,
   wherein a tilt angle detector for detecting the tilt angle of the loading device is further provided, and
   wherein the control section determines the strength of regenerative brakes during forward traveling of the vehicle on the basis of the height, the weight of the load, and the tilt angle of the loading device, and determines the strength of regenerative brakes during backward traveling of the vehicle on the basis of the height and the weight of the load.

6. The apparatus according to claim 1, wherein the control section continuously changes the strength of the braking in accordance with the weight of the load detected by the load weight detector.

7. The apparatus according to claim 1, wherein the control section shifts the vehicle to a neutral state when the unseated state detector detects that a driver has left the seat in the case where the traveling state detector detects a stopped state.

8. The apparatus according to claim 1, wherein the drive device is a drive motor that is powered by a battery mounted in a body of the vehicle to generate a drive force, and wherein the control section makes the drive motor apply regenerative brakes when the unseated state detector detects that a driver has left the seat in the case where the traveling state detector detects a traveling state, and also changes the strength of the regenerative brakes in accordance with the height and the weight of the load.

9. A method for controlling the travel of an industrial vehicle, the vehicle being provided with a loading device that performs load handling operations by raising and lowering a load and tilting relative to a body of the vehicle, and a drive device which generates a drive force for travel and is capable of generating a braking force, the method comprising:

detecting whether the vehicle is in a traveling state;
detecting whether a driver has left a vehicle's driver's seat;
detecting the height of the loading device;
detecting the weight of the load placed on the loading device;
detecting the tilt angle of the loading device; and
making the drive device generate a braking force when it is detected that a driver has left the seat in the case where it is detected that the vehicle is in a traveling state, and changing the strength of the braking in accordance with the height and the weight of the load,
weakening the braking strength in the case where the detected tilt angle indicates that the loading device is horizontal in comparison with the case where the tilt angle indicates that the loading device is tilting backward, and
shifting the vehicle to a neutral state in the case where the tilt angle indicates that the loading device is tilting forward.

* * * * *